US012784599B2

(12) United States Patent
Stoschek et al.

(10) Patent No.: US 12,784,599 B2
(45) Date of Patent: Nov. 3, 2026

(54) SYSTEMS AND METHODS FOR DETECTING SURFACE CONDITIONS

(71) Applicant: A^3 by Airbus, LLC, Sunnyvale, CA (US)

(72) Inventors: Arne Stoschek, Palo Alto, CA (US); Cedric Cocaud, Sunnyvale, CA (US)

(73) Assignee: A^3 BY AIRBUS, LLC, Sunnyvale, CA (US)

( * ) Notice: Subject to any disclaimer, the term of this patent is extended or adjusted under 35 U.S.C. 154(b) by 71 days.

(21) Appl. No.: 17/788,692

(22) PCT Filed: Dec. 23, 2019

(86) PCT No.: PCT/US2019/068408
§ 371 (c)(1),
(2) Date: Jun. 23, 2022

(87) PCT Pub. No.: WO2021/133385
PCT Pub. Date: Jul. 1, 2021

(65) Prior Publication Data
US 2023/0023670 A1 Jan. 26, 2023

(51) Int. Cl.
*G06T 7/33* (2017.01)
*G08G 5/21* (2025.01)
(Continued)

(52) U.S. Cl.
CPC ............... *G08G 5/21* (2025.01); *G06T 7/337* (2017.01); *G08G 5/54* (2025.01); *G08G 5/74* (2025.01); *G06T 2207/30192* (2013.01)

(58) Field of Classification Search
None
See application file for complete search history.

(56) References Cited

U.S. PATENT DOCUMENTS 5,353,022 A 10/1994 Middleton et al.
5,499,025 A * 3/1996 Middleton ............. G08G 5/025 701/16
(Continued)

FOREIGN PATENT DOCUMENTS

CN 103303487 A 9/2013
WO 2011119634 A1 9/2011

OTHER PUBLICATIONS

Communication pursuant to Article 94(3) EPC in EP Application No. 19 957 060.7-1207 mailed Jan. 9, 2025 (9 pgs).
(Continued)

*Primary Examiner* — Navid Z. Mehdizadeh
*Assistant Examiner* — Sarah A. Mueller
(74) *Attorney, Agent, or Firm* — NIXON PEABODY LLP

(57) ABSTRACT

The present disclosure generally pertains to systems and methods for detecting surface conditions using multiple images of different polarizations. A system in accordance with the present disclosure captures images having different polarizations and compares the images to evaluate surface conditions of an area, such as a runway, landing pad, roadway, or taxiway on which a vehicle is expected to land or otherwise travel. In some cases, a surface hazard, such as water, ice, or snow covering a surface of the area, may be detected and identified. Information indicative of the surface conditions may be used to make control decisions for operation of the vehicle.

18 Claims, 7 Drawing Sheets

(51) Int. Cl.
*G08G 5/54* (2025.01)
*G08G 5/74* (2025.01)

(56) References Cited

U.S. PATENT DOCUMENTS

| | | | | |
|---|---|---|---|---|
| 9,129,185 | B1 * | 9/2015 | Murata | G06T 5/73 |
| 10,196,141 | B1 * | 2/2019 | Cui | H04N 7/181 |
| 10,202,204 | B1 * | 2/2019 | Daidzic | B64C 5/02 |
| 10,266,162 | B2 * | 4/2019 | Gonidec | B60T 8/17616 |
| 2008/0129541 | A1 * | 6/2008 | Lu | G06V 20/56<br>340/905 |
| 2008/0167819 | A1 * | 7/2008 | Breed | G08G 1/161<br>701/300 |
| 2012/0268602 | A1 | 10/2012 | Hideaki et al. | |
| 2013/0127642 | A1 | 5/2013 | Maggiore et al. | |
| 2013/0136306 | A1 * | 5/2013 | Li | G06V 10/145<br>382/103 |
| 2017/0124404 | A1 | 5/2017 | Katsuyasu et al. | |
| 2017/0183086 | A1 * | 6/2017 | Le-Bouedec | G01C 23/00 |
| 2019/0054906 | A1 | 2/2019 | Rakesh et al. | |
| 2020/0074639 | A1 * | 3/2020 | Zhao | G06T 7/40 |
| 2020/0098130 | A1 * | 3/2020 | Porter | G06T 7/0002 |

OTHER PUBLICATIONS

Jan. 26, 2024 First Chinese Office Action issued in Chinese Application No. 201980103345.0, pp. 17.

* cited by examiner

SYSTEMS AND METHODS FOR DETECTING SURFACE CONDITIONS

RELATED ART

In aviation, takeoffs and landings are relatively dangerous compared to other portions of a flight. Some of the risks associated with takeoffs and landings may be surface hazards that exist on runways or landing pads, such as snow, ice or water that might not be seen by the pilot. Snow, ice, or water may cause the aircraft to skid or hydroplane increasing the chance of an accident. Knowledge of such conditions allows the pilot or the autopilot system to make changes or take precautions to compensate for such conditions. However, seeing and recognizing such hazards can sometimes be difficult.

Cameras have been used in an effort to facilitate detection of hazardous conditions. If a surface hazard condition, such as water or ice, is detected on a runway or landing pad by a camera-based system, a pilot can be warned or otherwise notified of the surface hazard. For autonomous aircraft, hazardous conditions detected by a camera-based system may be used to make control decisions to mitigate or avoid the effects of the hazardous condition. However, it can be difficult for camera-based systems to detect at least some hazardous conditions. For example, water or ice on a runway is often substantially transparent and, therefore, can be difficult to detect. In this regard, ice or water allows light to pass and reflect from the surface of the runway or landing pad. Thus, in an image captured by a camera, a portion of a runway or landing pad covered by water or ice may appear similar to other portions of the runway or landing pad, thereby making it difficult to use segmentation or other known image processing techniques to detect the presence of water or ice on the runway or landing pad.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
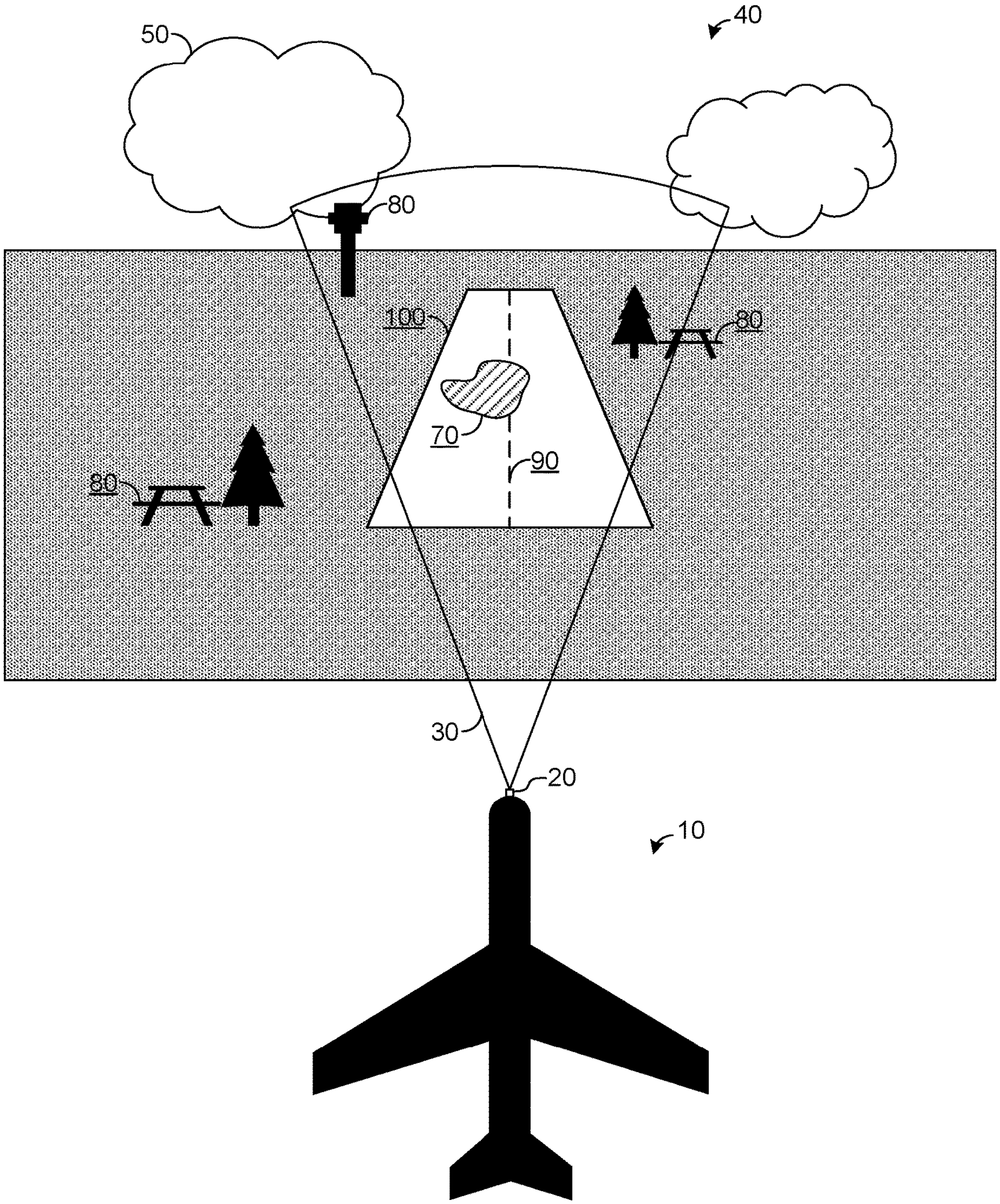
FIG. 1 is a block diagram illustrating a vehicle using an exemplary polarizing sensor.

The present disclosure generally pertains to systems and methods for detecting surface conditions. A system in accordance with one embodiment of the present disclosure is mounted or otherwise positioned on a vehicle and detects surface conditions external to the vehicle by capturing, processing, and analyzing multiple images of differing polarization. In this regard, the system uses at least one image sensor to capture a plurality of images of external areas (e.g., roadways, taxiways, or landing zones, such as runways or landing pads). At least one image is polarized differently than another image, and the two images with differing polarizations are compared to provide a comparison image. As an example, two images of the same surface may be orthogonally polarized and subtracted, though other types of polarization and comparisons may be performed in other embodiments. Certain types of surface conditions, such as water, ice, or snow, may have certain characteristics or signatures in the comparison image, thereby facilitating detection of the presence of these surface conditions in the comparison image. Thus, the comparison image may be analyzed to detect certain surface conditions, such as surface conditions that may be hazardous to the operation of the vehicle. When a hazardous surface condition is detected, a user (e.g., a pilot or driver) of the vehicle may be notified or information indicative of the detected surface condition may be used to control the vehicle.

Note that there are a variety of techniques that may be used to capture images of different polarizations. As an example, two or more cameras having different polarization configurations may be used. In this regard, each camera may have a polarizing filter that filters light differently than the polarizing filters of the other cameras. For example, one camera may have a filter that permits light in a first direction (e.g., a vertical direction) to pass, and another camera may have a filter that permits light in a direction (e.g., a horizontal direction) that is orthogonal to the first direction to pass. In other examples, a single sensor may be used to capture multiple images having different polarizations. For example, it is possible to use a camera with a polarizing filter that is moved, removed, replaced, or exchanged while taking successive shots. In another example, a single sensor may be used with a single polarizing filter that provides multiple polarizations to the sensor.

Once the system detects a hazardous surface condition for a surface that the vehicle is traveling or will travel, the system may warn a user of the hazardous condition in a variety of ways. For example, the system may activate an indicator light or provide some other visual warning in response to a detection of a certain hazardous condition, such as ice, snow, or water. If desired, an audio warning, such as a buzzer or voice recorded message, may be output to the user. In some embodiments, the output provided by the system may recommend certain user actions, such as certain types of braking maneuvers or other types of maneuvers for controlling operation of the vehicle. In some embodiments, the system may use information on the surface conditions to predict a braking distance required to bring the vehicle to a stop, and the system may output information indicative of the braking distance and/or whether the surface is suitable for operation. As an example, the system may compare the braking distance to a length of a runway and provide a warning if the runway is not sufficiently long to perform a safe braking maneuver. The system may also provide information indicating the location of a detected surface condition. For example, system may generate an image of a roadway, runway, taxiway, or landing pad and indicate the location of the detected hazard on the generated image.

Based on the surface conditions detected by the system, various actions may be taken to control the operation of the vehicle whether such control is implemented by a human operator (e.g., a pilot or driver) or by a control system, such as would be the case for an autonomous vehicle. As an example, a decision may be made to divert the vehicle away from a hazardous surface condition. In this regard, a decision may be made to land an aircraft at a different location in response to a detection of a hazardous surface condition at a landing zone. In another example, the vehicle may be controlled to bring the aircraft to a stop prior to reaching a hazardous surface condition detected by the system or otherwise controlled (e.g., steered) to avoid the hazardous surface condition. In other embodiments, decisions may be made to change vehicle operating characteristics based on the surface conditions (e.g., anti-lock braking thresholds or braking methods), and so forth. For example, for an aircraft reverse thrust and air braking may be relied on to a greater extent in response to a detection of a hazardous surface condition on a runway. In some embodiments, in the presence of ice or snow, certain braking techniques (e.g., a reduction in the braking force applied to one or more wheels) may be implemented to reduce the likelihood of skidding or hydroplaning.

In some embodiments, the system may be configured to wirelessly transmit information indicative of detected surface conditions from the vehicle. For example, information indicative of the type and location of certain surface conditions on a runway or landing pad may be reported to airport maintenance crew who may attempt to remove or compensate for the surface condition. As an example, the maintenance crew may apply salt on the runway for melting the detected ice. In another example, the information may be reported to other vehicles to warn other pilots, drivers, or control systems for these vehicles. The information may be used to update a map showing hazardous surface conditions. In other embodiments, the information provided by the system may be used for other purposes.

FIG. 1 is a block diagram illustrating a vehicle 10 having an exemplary polarizing sensor 20 for use in detecting surface conditions. The vehicle 10, in this case an aircraft, is outfitted with a polarizing sensor 20 on its fuselage (e.g., nose), but the sensor 20 can be positioned at other locations on the vehicle 10 in other embodiments. The sensor 20 has a field of view 30 that may be directed to an area of interest, such as a landing zone 100 (e.g., a runway or landing pad), for assessing surface conditions at such area. Within the field of view 30 of the sensor 20, there may be various potential obstructions 80, sky 40, clouds 50, surface markings 90 (e.g., runway, taxiway, or roadway markings), and surface hazards 70. The landing zone 100 depicted in FIG. 1 is a runway, but other types of landing zones 100 may be imaged in other embodiments. The surface markings 90 may include lights positioned on or in the surface of the landing zone 100 or lines or other types of markings painted or otherwise formed on the surface of the landing zone 100 for use in guiding a pilot attempting to land on or takeoff from the landing zone 100.

Note that a surface hazard 70 generally refers to any surface condition or anomaly that may be a hazard to the safe operation of the vehicle 10 if the vehicle encounters the surface condition during operation. As an example, a surface hazard 70 may be a pot hole in the pavement of the landing zone 100 or ice, snow or water on a surface of the landing zone 100.

While in this example vehicle 10 is an airplane, in other embodiments, the vehicle 10 may be of any type including motorcycles, cars, and trucks. The vehicle 10 may also be other types of aircraft, such as helicopters, drones, and vertical takeoff and landing (VTOL) aircraft. Further, the vehicle 10 may be controlled by a user (e.g., pilot) on board the vehicle 10, or control of the vehicle 10 may be autonomous, such as by a controller on the vehicle or at other location. Exemplary autonomous vehicles are described by U.S. application Ser. No. 16/302,263, entitled "Self-Piloted Aircraft for Passenger or Cargo Transportation" and filed on Nov. 16, 2018, which is incorporated herein by reference.

While the polarizing sensor 20 is depicted at the nose of the vehicle 10, it could be placed anywhere (e.g., on the wings or at the top or bottom of the fuselage) with a view of the area to be evaluated. As an example, for a VTOL aircraft, the sensor 20 may positioned underneath the aircraft 10 to view the area directly below the aircraft during a takeoff or landing. The sensor 20 may be mounted in a fixed position or it may be mounted such that it can move (e.g., rotate left, right, up, and down) to allow the image sensor to monitor different fields of view. In addition, any number of polarizing sensors 20 may be used on the vehicle 10. As will be described in more detail below, a polarizing sensor 20 is configured to capture a polarized image and may include one or more polarizing filters for providing polarized light.

Figure 2A:
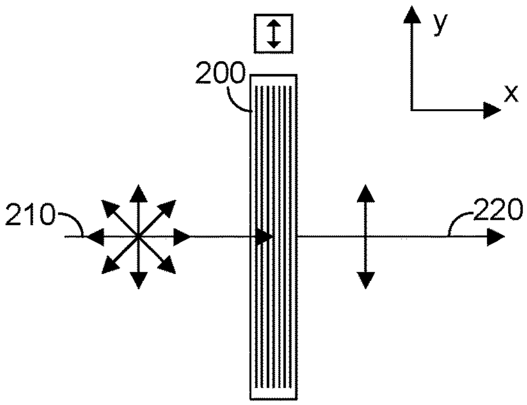
FIGS. 2*a-b* are diagrams illustrating exemplary polarizing filters.
Figure 2B:
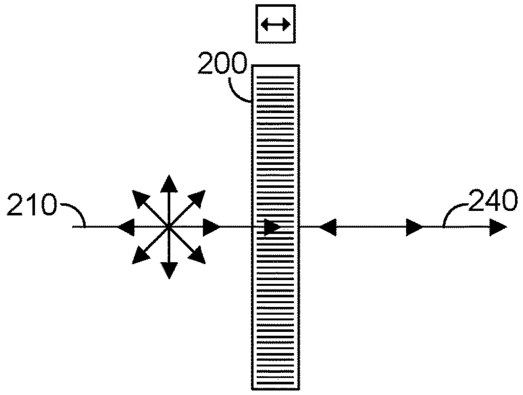

FIGS. 2*a-b* are diagrams illustrating exemplary effects of polarizing filters, which are linear polarizing filters in this example. As shown in FIG. 2*a*, unpolarized light 210 enters a linear polarizing filter 200. The light 210 received by the filter 200 is unpolarized in that it is composed of waves traveling in random directions. The filter 200 then filters the light 210 based on direction. In this regard, light 210 traveling in a certain direction or range of directions passes through the filter 200 without attenuation, but light traveling in other directions is attenuated. For example, as light 210 enters a vertically-aligned linear polarizing filter 200, also referred to herein as a "vertically-polarized filter," it is filtered so that light traveling in a vertical direction (i.e., y direction) passes without attenuation. Such light 220 may be referred to as "vertically-polarized light." If the same linear polarizing filter 200 is rotated 90 degrees, the filter 200 becomes a horizontally-aligned linear polarizing filter, also referred to herein as "horizontally-polarized filter," that allows light 210 traveling in a horizontal direction (i.e., x-direction) to pass without attenuation. When the filter 200 is polarized in a certain direction (e.g., vertical or horizontal) so that light traveling in such direction (referred to hereafter as "polarized direction") passes without attenuation, light traveling in other directions may be attenuated by the filter depending on its direction of travel. Specifically, light traveling in a direction closer to the polarized direction may be attenuated less than light traveling in a direction that is further from the polarized direction. Indeed, light polarized orthogonally from the polarized direction of the filter 200 may be filtered entirely or, in other words, completely blocked by the filter 200.

As used herein, a "polarized image" refers to an image of polarized light. As an example, a polarized image may be formed by passing light through a polarizing filter (such as a vertically-polarized filter or horizontally-polarized filter) and then captured by an optical sensor (e.g., a camera) to form a polarized image. In accordance with some embodiments of the instant disclosure, images of light polarized in different directions are compared in order to identify surface conditions that may otherwise be difficult to see with the naked eye.

In this regard, light reflects differently from different types of surfaces. As an example, light may reflect from asphalt, such as may be used for runways, taxiways, landing pads, or roadways, differently than from water or ice formed on the asphalt. Such water or ice may be substantially transparent making it difficult to see or identify the water or ice in an unpolarized image or with the naked eye. However, by comparing differently polarized images of the same scene, differences in the reflection properties of the water or ice relative to the reflection properties of the asphalt can be accentuated, thereby facilitating detection of the water or ice on the asphalt.

To better accentuate these differences, it may be desirable for the polarized directions of the images in the comparison to be as different as possible. As an example, two images that are orthogonally polarized (e.g., a horizontally-polarized image and a vertically-polarized image) may be compared. However, it is possible for the difference in polarization to be less or otherwise different in other embodiments.

Note that there are various techniques that may be used to perform a comparison of images that are polarized differently. In some embodiments, the comparison may be performed by subtraction. As an example, a pixel-by-pixel subtraction may be performed such that a pixel in one image is subtracted from a corresponding pixel (e.g., a pixel representing the same geographic location) in the other image, resulting in a "differential image" where each pixel value of the differential image is the difference between corresponding pixels of the polarized images. In other embodiments, other types of comparisons may be performed. As an example, addition, multiplication, or other types of mathematical operations may be performed on corresponding pixel values.

Figure 3:
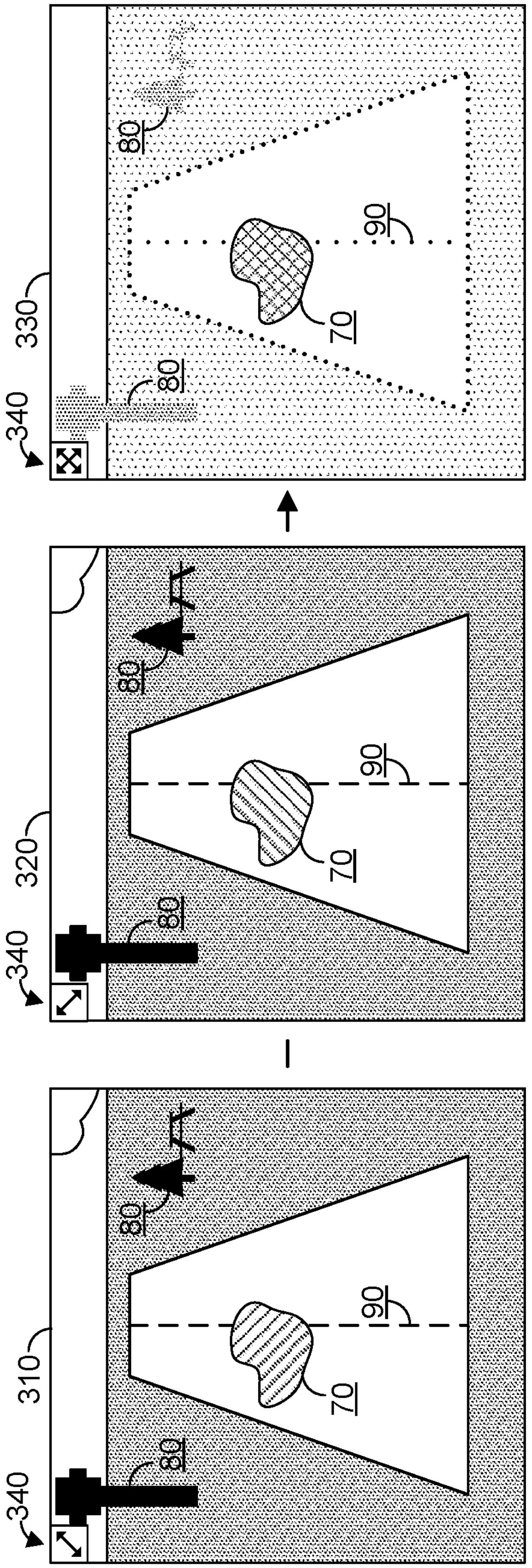
FIG. 3 illustrates an exemplary comparison of two polarized images.

FIG. 3 illustrates an exemplary comparison of two polarized images that are orthogonally polarized. For reference, indicator 340 indicates the respective direction of polarization indicating that image 310 is polarized orthogonally relative to the polarization of the image 320. When the images are subtracted, objects of the resulting image may appear faded (e.g., have smaller difference values), because there may be a small difference between the light reflected at the two different polarizations. Other objects may appear less faded (e.g., have greater difference values) by comparison, because there may be a greater difference between the light reflected at two different polarizations.

As an example, the differences of the pixels representing a surface hazard 70 (such as a patch of ice or puddle of water) may be significantly greater (or otherwise different) than the differences of the pixels representing a surface (e.g. asphalt) of the landing zone 100, such as a runway. Thus, the surface hazard 70 may appear accentuated in the differential image 330 relative to the landing zone 100, thereby facilitating detection of the surface hazard 70.

Moreover, certain surface conditions may exhibit certain patterns or ranges of difference values making it possible not just to detect the presence of the surface condition but to identify the type of surface condition (and, hence, hazard for surface conditions that are hazardous). In this regard, a surface condition or hazard of a certain type may have a signature in the differential image 330 that can be learned and then used to identify the type of or, in other words, classify surface condition in the image 330. Thus, a system may use the differential image 330 not just to detect the presence of a surface hazard but also identify its type. Note that FIG. 3 shows a comparison of two polarized images, but any number of polarized images may be compared (e.g., subtracted) in other embodiments.

Figure 4A:
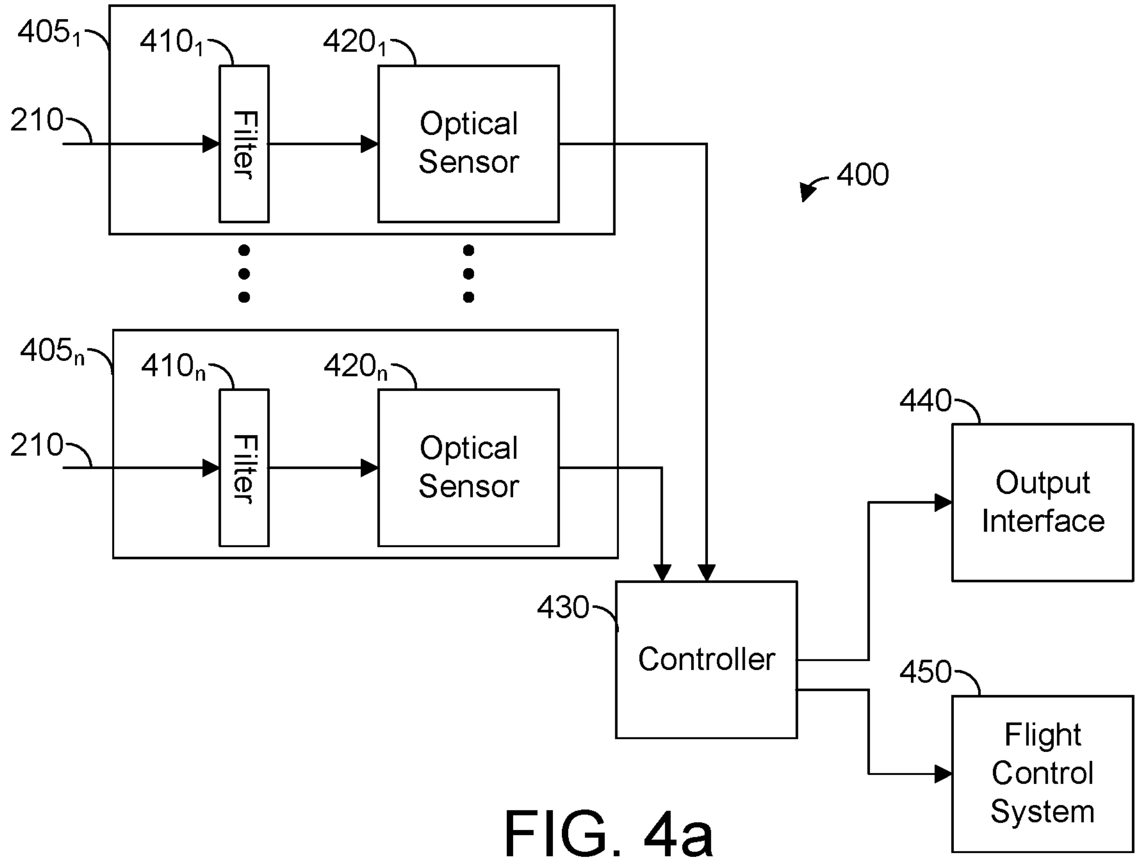
FIG. 4*a* is a block diagram illustrating an exemplary embodiment of a system for detecting hazardous surface conditions.

FIG. 4*a* is a block diagram illustrating an exemplary embodiment of a system 400 for detecting surface hazards. The system 400 comprises a plurality of polarizing sensors 405 for providing polarized images and a controller 430. In the embodiment depicted by FIG. 4 *a*, each polarizing sensor 405 has a polarizing filter 410 and an optical sensor 420. The polarizing filter 410 is configured to filter unpolarized light 210 to provide polarized light that that is sensed by the optical sensor. In this regard, the optical sensor 420 is configured to capture a polarized image 320. Thus, as described above, each polarizing filter 410 polarizes light differently based on polarized light from its corresponding filter 410. As an example, light from two filters 410 may be orthogonally polarized such that one sensor 405 may capture an image of light polarized in a first direction (e.g., horizontally-polarized light), and another sensor 405 may capture an image of light polarized in a direction orthogonal to the first direction (e.g., vertically-polarized light). In other examples, other types of polarizations may be used. As an example, one polarizing filter 410 could provide linear polarization, and another polarizing filter 410 could provide circular polarization or other type of polarization. In another example, one sensor 405 may sense linearly or circularly polarized light, and another sensor 405 may sense unpolarized light. Moreover, the sensors 405 can sense any collection of linearly-polarized, circularly-polarized, elliptically-polarized, or unpolarized light as long as the polarizations of images being compared are sufficiently different such that one or more surface hazards are identifiable when the images are evaluated.

The optical sensors 420 may be cameras, arrays of photo detectors, or other type of sensors for capturing images. Images captured by these optical sensors 420 are transmitted to the controller 430, which compares the images to detect surface conditions (e.g., surface hazards) and provides information indicative of the detected surface conditions to an output interface 440 and/or flight control system 450 as will be discussed later in more detail.

Figure 4B:
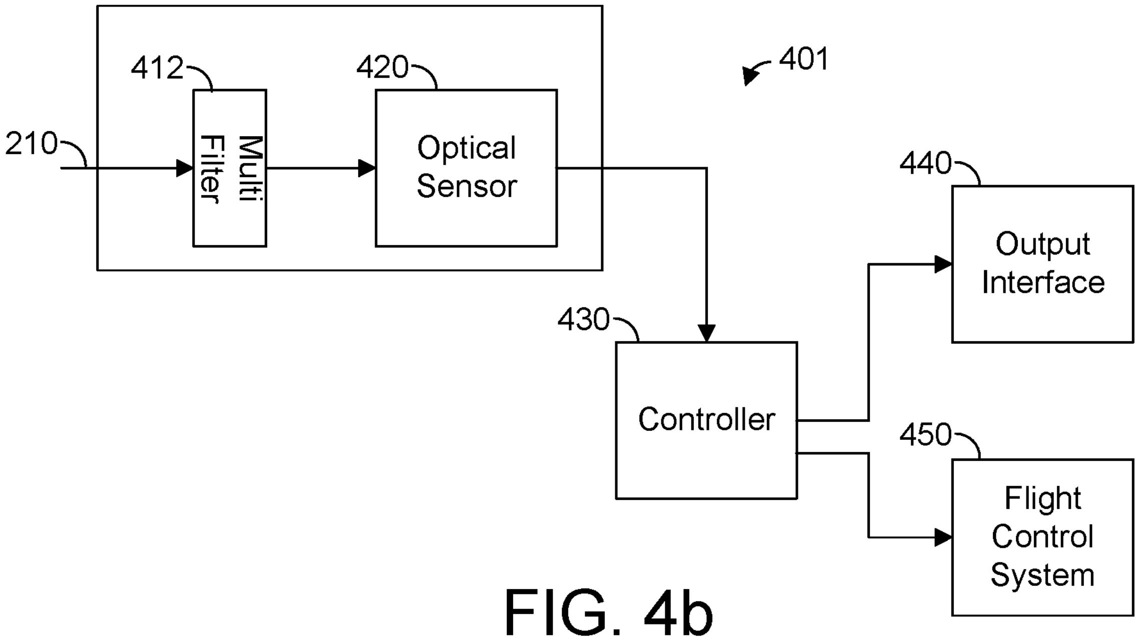
FIG. 4*b* is a block diagram illustrating another exemplary embodiment of a system for detecting hazardous surface conditions.

FIG. 4*b* depicts an alternate embodiment of a system 401 for detecting surface hazards. The system 401 of FIG. 4*b* uses a single polarizing sensor 405 to provide multiple images that are polarized differently. There are various techniques that may be used to achieve this. In one embodiment, the sensor's polarizing filter 410 may be used to capture an image of one polarization, and the polarizing filter 410 may be rotated (e.g., 90 degrees) before taking the next image such that the next image is polarized differently (e.g., orthogonally) relative to the first image. In another embodiment, the filter 410 may be configured such that the polarization for at least some pixels are different relative to the polarization for other pixels. This could take a form of a lens formed of a two dimensional array of polarizing filters where different filters are next to each other in groupings providing differing polarizations. In such an example, the pixels associated with one polarization may be separated from the pixels associated with a different polarization to essentially decouple the same image into two different images of differing polarizations. The decoupled images may then be compared to detect surface conditions, as described herein. In other embodiments, yet other technique for providing images that are polarized differently are possible.

Figure 5:
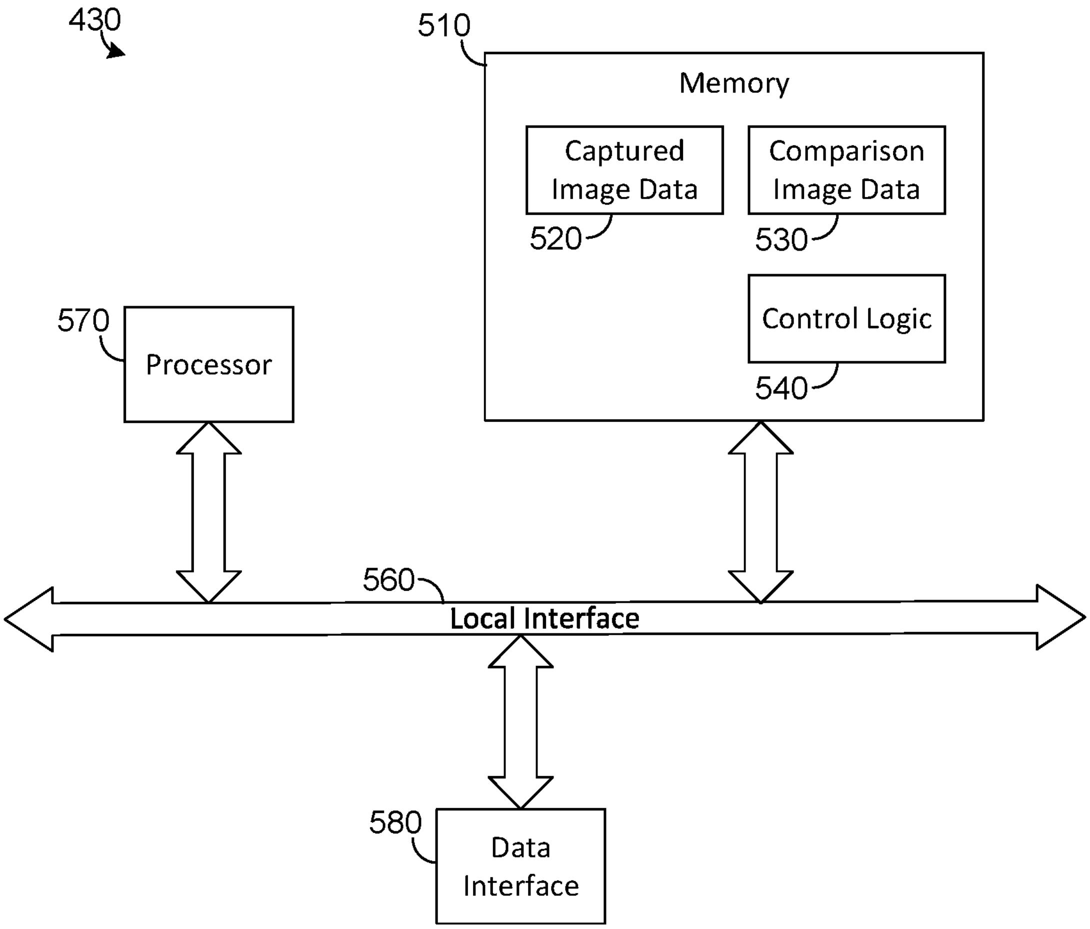
FIG. 5 is a block diagram illustrating an exemplary embodiment of a controller, such as is depicted in FIGS. 4*a* and 4*b*.

Controller 430 can be implemented in a variety of ways including specific analog hardware, general-purpose machines running software, or a combination thereof. FIG. 5 is a block diagram illustrating an exemplary embodiment of a controller 430. At least one processor 570 is coupled to memory 510 and a wired or wireless data interface 580 (e.g., Ethernet, USB, WiFi, etc.) through local interface 560 (e.g., a serial bus). The memory 510 contains data and instructions that enable the processor 570 to perform functions including control logic 540 that may be executed by the processor 570 to perform the controller's functions, as described herein. The memory 510 may be configured to store image data 520, referred to herein as "captured image data," defining images captured by the polarizing sensors 405 (FIGS. 4*a* and 4*b*) and image data 530, referred to herein as "comparison image data," indicative of comparisons between the images defined by the captured image data 520. As an example, the controller 430 may subtract differently polarized images defined by the captured image data 520 to generate a differential image that is stored in the comparison image data 530. While the controller 430 is shown separate from the flight control system 450 and output interface 440, in some embodiments, these components may share resources such as at least one processor 570 and memory 510. In some embodiments, the image comparison (e.g., image subtraction) could be performed by hardware, and the result of the comparison may be passed to processor 570 for further processing, such as for analysis to detect surface hazards, as described herein.

Figure 6:
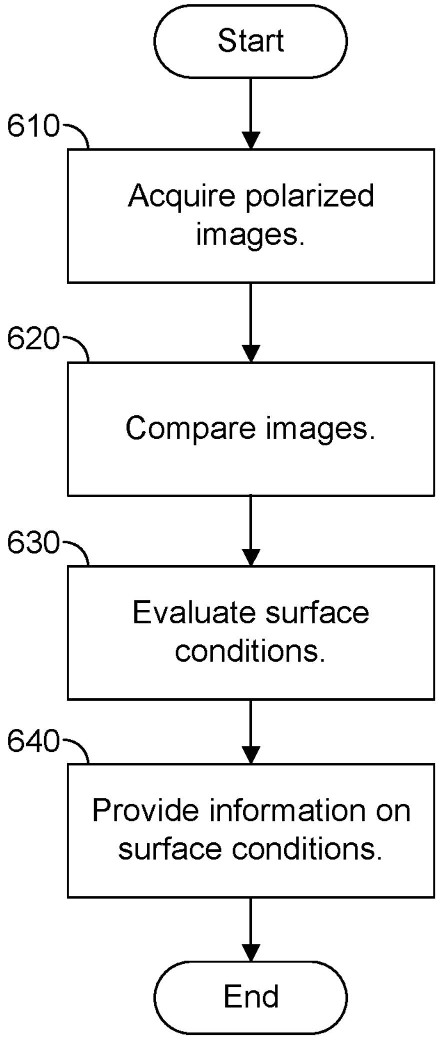
FIG. 6 is a block diagram illustrating an exemplary process of detecting surface conditions.

FIG. 6 is a block diagram illustrating an exemplary process of detecting surface conditions. The controller 430 through one or more of the polarizing sensors 405 acquires polarized images of the same scene (e.g., a landing zone 100) at step 610. This includes at least two images of differing polarizations (e.g., two or more orthogonally polarized images) as mentioned earlier. At step 620, the controller 430 compares the captured images. The resulting comparison image 530 may be in the form of a differential image 340 where each pixel of the differential image indicates a difference between corresponding pixels of the images being compared.

At step 630, the resulting image is evaluated for surface conditions. The controller 430 performs segmentation, identification, and classification on the comparison image 530. In some embodiments, segmentation, identification, and classification may be performed on the original captured images 520 and used with the comparison image to further segment, identify, and classify the objects, features, and hazards in view. Segmentation can also be used to eliminate false positives or to change how a detected condition or hazard is processed. For example, a portion of the resulting image or original image may be identified as an area of no interest and then culled so that it is not analyzed for detection of surface hazards or other types of surface conditions. As an example, a portion of an image may be identified as sky for which no surface hazards should be present. Such a portion can be culled so that it is not further processed by the controller 430.

External factors may also affect the evaluation (e.g., classification) of surface conditions. Such external factors may include location, date, reported air temperature, reported ground temperature, physical characteristics of etc. Location may be detected through a location sensor, such as a global positioning system (GPS) sensor. As an example, in evaluating the surface conditions, the controller 430 may detect a surface condition having a signature similar to that as ice. However, if the surface temperature for the region is above a certain threshold above freezing, such as 50 degrees Fahrenheit, for example, the controller 430 may be configured to refrain from classifying the surface condition as ice. If the vehicle 10 is located over a region with a high concentration of swamps, then the controller 420 may be configured to identify a region with a significant percentage of surface area covered with water as a "swamp." However, if the vehicle 10 is located over a region known to be free of swamps, then the controller 430 may refrain from identifying such an area as a "swamp." External factors may be used in other ways to aid in the identification of surface conditions in other examples.

In evaluating the surface conditions, certain surface hazards may be detected, such as water, ice, or snow. Features may be detected during this process, such as the presence of route significant objects (e.g., a road, runway, or taxiway). Features may include the interpreting of signs and markings associated with an object (e.g., street signs, lights, runway markings, runway markings, etc.). As an example, runway markings may be identified in a captured image and used to identify and define the boundaries of the corresponding runway. Features may also broadly include estimates about the characteristics (e.g., length of the runway, flatness of a field). Such estimates may be determined based on the captured images. As an example, the length of a runway may be estimated based on its length in one or more captured images. In other embodiments, the length of a runway may be predefined and stored in the system 440. As an example, a runway could be identified based on the vehicle's location relative to the runway, and the length of the identified runway may be retrieved from memory. In other embodiments, other techniques for estimating characteristics of features are possible.

Hazards and features may be interrelated. For example, some surface conditions may be classified as a hazard depending on how the surface condition relates to detected features. As an example, in some embodiments, ice may be identified as a surface hazard only if it covers a certain percentage or certain areas of the vehicle's landing zone 100, such as a runway, landing pad, or roadway segment. As an example, if ice is located near the edge of a runway but the center of a runway is substantially free of ice, then the ice may not be a threat to the safe operation of the vehicle 10 and, thus, might not be classified as a hazard.

The controller 430 is configured to provide information on surface conditions, including surface hazards at step 640. This information is provided to the output interface 440 and flight control system 450. Based on the surface conditions detected, one or more actions may be performed.

These actions may come in the form of providing information, warnings, or alerts through audio or visual medium of the output interface 440. In an operator controlled vehicle 10, these alerts might come in the form of sounds or lights. For example, an indicator light may be illuminated to indicate particular hazards, a class of hazards, or hazards in general (e.g., ice on road light, slick conditions light, or hazard light). In some embodiments, the controller 430 through the output interface 440 may indicate the location of a surface hazard by use of a display (e.g., heads up display or monitor displaying text, a map, augmented reality, or a display image with the hazard location indicated or highlighted). In some embodiments, this may come in the form of displaying the comparison image 530 over one of the captured images 520 or at least subsets of the comparison image 530 determined to be a hazard or otherwise of interest. In other embodiments, the hazards or objects of interest may be highlighted, circled, or otherwise indicated.

In some embodiments, the output may include recommendations to the pilot or driver regarding operation of the vehicle, such as suggestions for certain maneuvers. As an example, based on the detected surface conditions, including hazards, the controller 430 may be configured to detect a braking distance for the vehicle 10 and provide information on the braking distance to the pilot, driver, or other user. In this required, the braking distance is generally the distance that the vehicle 10 travels while performing a braking maneuver to bring the vehicle 10 to a stop. The braking distance may be longer when the runway, roadway, or other pathway has certain surface conditions, such as ice, snow, or water. In some cases, the controller 430 may store predefined data indicative of the expected braking distance for the vehicle 10 for different types of surface conditions and look up or otherwise retrieve the braking distance associated with the type of surface condition detected. In other embodiments, the controller 430 may calculate the braking distance based on measured performance parameters of the vehicle 10, such as the vehicle's ground speed or other parameters measured by the vehicle's sensors. Such calculation may take into account the types of surface conditions detected. If desired, the controller 430 may provide an output indicative of the estimated braking distance, and a user may make control decisions based on such information, such as whether to divert the vehicle 10 away from surface hazards (e.g., select a new landing location or new path for the vehicle 10) or select a certain braking procedure for slowing or stopping the vehicle 10. As an example, in response to adverse surface conditions that would increase braking distance for a normal braking procedure, a pilot may select a different braking procedure that tends to reduce braking distance. Or is less affected by the detected surface conditions. As an example, when landing on a runway, a pilot may elect to utilize reverse thrusters if a surface hazard, such as ice or water, is detected on the runway.

In some embodiments, the controller 430 may be configured to compare the estimated braking distance to a length of the runway or other pathway available for the braking procedure and provide a warning if the braking distance exceeds or is within a certain range of such length. For example, if the controller 430 determines that the estimated braking distance is close to the length of the runway or other pathway, the controller 430 may provide a warning indicating to the pilot or other user that the braking procedure may be unsafe for the types of surface conditions detected.

In some embodiments, the controller 430 may be configured to wirelessly transmit the information indicative of the surface conditions from the vehicle. For example, information regarding surface hazards may be sent to a mapping service or other vehicles to warn other drivers or pilots of the surface hazards, or such information may be sent to ground crews who may then take actions to mitigate or remove the detected surface hazards.

In some embodiments, similar information described above as being output to the output interface 440 may also or alternatively be output to the flight control system 450, which may automatically control operation of the vehicle 10 based on such information. As an example, the vehicle 10 may be autonomously controlled by the flight control system 450, which may control the vehicle 10 based on surface conditions detected by the system 400. As an example, the flight control system 450 may be configured to select an appropriate braking maneuver to use, as described for the user-based decisions, or decide whether to abort a landing or otherwise divert the vehicle 10 based on surface conditions. If the vehicle 10 is an aircraft, the flight control system 450 may select or suggest a suitable landing area based on the surface conditions.

For land-based vehicles, roads, shoulders, bridges, and the like may be evaluated. Braking characteristics may be changed based on surface conditions, such as when to initiate antilock braking, limit braking over hazards, or limit braking to hazard free areas. Path of travel may be adjusted to position tires on hazard-free sections of the pavement or pathway.

In some embodiments, the polarizing sensor 20 may be attached to a pivoting or movable mount allowing the sensor 20 to track areas of interest while the vehicle 10 is moving. In other embodiments, multiple sensors 20 could be used to expand the area around the vehicle 10 capable of being monitored for surface conditions. In the event that a landing zone 100 for the vehicle 10 is found unsuitable or for some reason an emergency landing becomes necessary, the sensor 20 can help scan the area around the vehicle 10 and locate potential landing areas by providing additional information about the surface conditions of various potential landing zones 100 to the vehicle operator or the flight control system 450.

Figure 7:
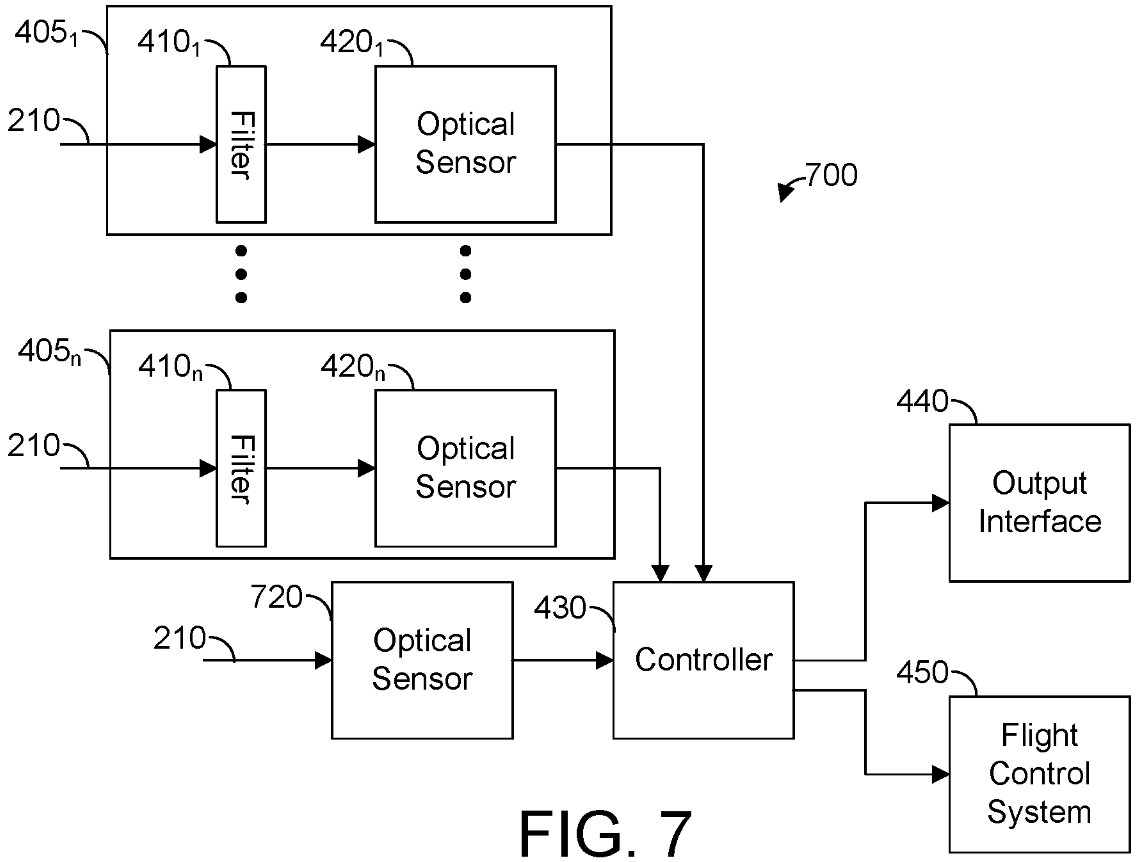
FIG. 7 is a block diagram illustrating an exemplary embodiment of a system for detecting hazardous surface conditions.

In some embodiments, the controller 430 is configured to process an image based on a detected surface hazard. For example, FIG. 7 depicts an exemplary embodiment of a system 700 for detecting surface hazards. As shown by FIG. 7, the system 700 has an optical sensor 720 for capturing images of un-polarized light 210 from the same scene captured by polarizing sensors 405. The controller 430 may provide the captured images of un-polarized light, referred to hereafter as "un-polarized images," to the output interface 440 or the flight control system 450 for processing or analysis. As an example, the output interface 440 may display the un-polarized images to a pilot who may view such images to make decisions for guiding the vehicle 10, such as finding a suitable landing zone or steering the vehicle to a desired area. The flight control system 450 may analyze the un-polarized images to make similar control decisions for guiding the vehicle 10.

For certain types (e.g., classifications) of surface hazards, the optical properties of the surface hazards may cause artifacts in the un-polarized images that could result in errors in processing or analyzing such images. In some embodiments, when the controller 430 detects a certain type of surface hazard from polarized images, as described above, the controller 430 may be configured to remove or otherwise adjust the detected surface hazard in an un-polarized image in an effort to prevent the surface hazard from affecting the subsequent processing or analysis of the un-polarized image.

In this regard, the controller 430 may be configured to determine the location of a detected surface hazard in one or more of the polarized images and then identify the corresponding location in the un-polarized image where the same surface hazard should be located. That is, upon detecting a surface hazard of a certain type from polarized images, the controller 430 may identify the surface hazard's location in the un-polarized image and then remove or otherwise adjust the pixels at such location in the un-polarized image.

Note that there are various techniques that may be used to remove or adjust the pixels at the location of the surface hazard. As an example, the pixel values at such location may be replaced with predefined pixel values. Alternatively, surrounding pixel values in the un-polarized image close to (e.g., within a certain distance of) the surface hazard may be averaged or otherwise combined to generate new pixel values to be used to replace the pixel values of the surface hazard. Yet other techniques for adjusting the pixel values of the surface hazard are possible in other embodiments. Moreover, by removing or otherwise adjusting the pixel values of certain types of surface hazards in the un-polarized images, at least some errors induced by artifacts that would otherwise be present in the un-polarized image may be prevented. Note that similar technique may be used to adjust pixel values of un-polarized images in the embodiment depicted by FIG. 4*b*.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

The invention claimed is:

1. A system for use with a vehicle, comprising:
- at least one optical sensor;
- at least one polarizing filter positioned to filter light received by the at least one optical sensor such that the at least one optical sensor provides a plurality of polarized images, including at least a first image having a first polarization and a second image having a second polarization different than the first polarization; and
- a controller configured to compare at least the first image and the second image for evaluating surface conditions of an area external to the vehicle; and
- wherein the controller is configured to identify a surface condition and boundaries of a pathway for the vehicle within the area, wherein the controller classifies the surface condition as a surface hazard responsive to determining that a location of the surface condition is within a predefined portion of the identified pathway;
- wherein the controller is configured to, in response to detecting a presence of the surface hazard, control the vehicle to (i) increase reverse thrust and (ii) reduce braking force of the vehicle.

2. The system of claim 1, wherein the at least one optical sensor is coupled to the vehicle.

3. The system of claim 1, wherein the controller is configured to select a path for the vehicle based on the surface conditions.

4. The system of claim 1, wherein the vehicle is an aircraft, and wherein the controller is configured to select a landing zone for the aircraft based on the surface conditions.

5. The system of claim 1, wherein the vehicle is an aircraft, and wherein the area is a landing zone or taxiway for the aircraft.

6. The system of claim 1, wherein the vehicle is an aircraft, and wherein the controller is configured to autonomously control flight parameters for the aircraft based on surface conditions.

7. The system of claim 1, wherein the controller is configured to provide a warning to a user of the vehicle based on an evaluation of the surface conditions.

8. The system of claim 1, wherein the controller is configured to subtract the first image from the second image to provide a differential image, wherein the controller is configured to perform segmentation on the differential image for identifying objects within the differential image, wherein the controller is further configured to identify and classify at least one of the objects as a surface hazard, and wherein the system comprises an output interface configured to provide an output indicative of a classification of the surface hazard.

9. The system of claim 1, further comprising a wireless communication device configured to wirelessly transmit information from the vehicle, wherein the controller is further configured to provide information to a user onboard the vehicle based on the classifying.

10. The system of claim 1, wherein the surface hazard is at least one of a group including: water, ice, and snow.

11. The system of claim 1, wherein the controller is further configured to provide an output to a user of the vehicle and using an output interface based on the surface hazard, wherein the output indicates a type of surface hazard identified by the controller.

12. The system of claim 1, wherein the controller is further configured to provide an output to a user of the vehicle and using an output interface based on the surface hazard, wherein the controller is configured to determine a location of the surface hazard, and wherein the output indicates the location.

13. The system of claim 12, wherein the output defines a map of the area, and wherein the map indicates the location of the surface hazard.

14. The system of claim 1, wherein the controller is further configured to provide an output to a user of the vehicle and using an output interface based on the surface hazard, wherein the output indicates a braking maneuver for the vehicle.

15. The system of claim 1, wherein the boundaries of the pathway are identified based on an identification of one or more boundary markers associated with the pathway.

16. The system of claim 1, wherein the predefined portion comprises a threshold percentage of the pathway for the vehicle within the area.

17. A non-transitory computer readable medium comprising instructions that, when executed by one or more processors, cause the one or more processors to:
- receive a plurality of images captured by at least one optical sensor of a vehicle, the plurality of images including a first image having a first polarization, a second image having a second polarization different from the first polarization, and an un-polarized image;
- perform a comparison between the first image and the second image; and
- identify a surface condition and boundaries of a pathway for the vehicle within an area external to the vehicle;
- classify the surface condition as a surface hazard responsive to determining that a location of the surface condition is within a predefined portion of the identified pathway; and
- in response to detecting a presence of the surface hazard, control the vehicle to (i) increase reverse thrust and (ii) reduce braking force of the vehicle.

18. A method for use on a vehicle, comprising:
- capturing a plurality of images with at least one optical sensor of the vehicle, the plurality images including at least a first image having a first polarization, a second image having a second polarization different than the first polarization, and an un-polarized image;
- comparing the first image to the second image with a controller;
- identifying a surface condition and boundaries of a pathway for the vehicle within an area external to the vehicle; and classifying the surface condition as a surface hazard responsive to determining that a location of the surface condition is within a predefined portion of the identified pathway; and in response to detecting a presence of the surface hazard, controlling the vehicle to (i) increase reverse thrust and (ii) reduce braking force of the vehicle.

* * * * *